United States Patent [19]
Olnowich et al.

[11] Patent Number: 5,384,773
[45] Date of Patent: Jan. 24, 1995

[54] MULTI-MEDIA ANALOG/DIGITAL/OPTICAL SWITCHING APPARATUS

[75] Inventors: Howard T. Olnowich; John D. Jabusch, both of Endwell; Robert F. Lusch, Vestal; Michael A. Maniguet, Owego, all of N.Y.

[73] Assignee: International Business Machines Corp., Armonk, N.Y.

[21] Appl. No.: 947,196

[22] Filed: Sep. 17, 1992

Related U.S. Application Data

[63] Continuation-in-part of Ser. No. 677,543, Mar. 29, 1991, abandoned, Ser. No. 799,497, Nov. 27, 1991, abandoned, and Ser. No. 799,602, Nov. 27, 1991.

[51] Int. Cl.[6] .................. H04Q 11/04; H04J 3/02
[52] U.S. Cl. ........................ 370/60.1; 370/58.2; 370/91
[58] Field of Search ............... 370/112, 53, 58.1, 110, 370/60, 60.1, 58.2, 58.3, 94.1, 91, 92, 93, 24, 29, 32, 62; 340/825.8, 825.24, 825.25, 826, 825.07, 825.52, 94.2; 395/154

[56] References Cited

U.S. PATENT DOCUMENTS

| | | | |
|---|---|---|---|
| 4,234,927 | 11/1980 | First | 364/557 |
| 5,010,545 | 4/1991 | Jacob | 370/91 |
| 5,128,929 | 7/1992 | Kobayashi | 370/60 |
| 5,195,086 | 3/1993 | Baumgartner et al. | 370/62 |

FOREIGN PATENT DOCUMENTS 0239908 10/1987 European Pat. Off. .
0366938 5/1990 European Pat. Off. .

OTHER PUBLICATIONS

"The Architecture of a Multicast Broadband Packet Switch", 1988 IEEE, pp. 1-8, by Lee et al.
"Periodic Time Slot Scheduling In Unbuffered Interconnection Networks", IEEE 1988, pp. 628-632, by Mukherji et al.
Kun US Statutory Invention Registration Feb. 1989, FIG. 1 "ISDN D Channel Handler".

Primary Examiner—Douglas W. Olms
Assistant Examiner—Huy D. Vu
Attorney, Agent, or Firm—Eugene I. Shkurko; Lynn L. Augspurger

[57] ABSTRACT

Disclosed is multi-media switching apparatus for performing digital, analog, and/or optical communications amongst multiple nodes over switching networks. The key aspect of the present invention is the full parallel aspect of the switching apparatus which supports n simultaneously, low-latency connections, where n is the number of functional elements interconnected by the switching network. Any of the n simultaneous transmissions can be digital, analog, or optical in any proportion. In addition, the present invention can also serve as a high-speed distributed controller for the purpose of selecting analog or optical switches for information transfer between elements of the system.

18 Claims, 13 Drawing Sheets

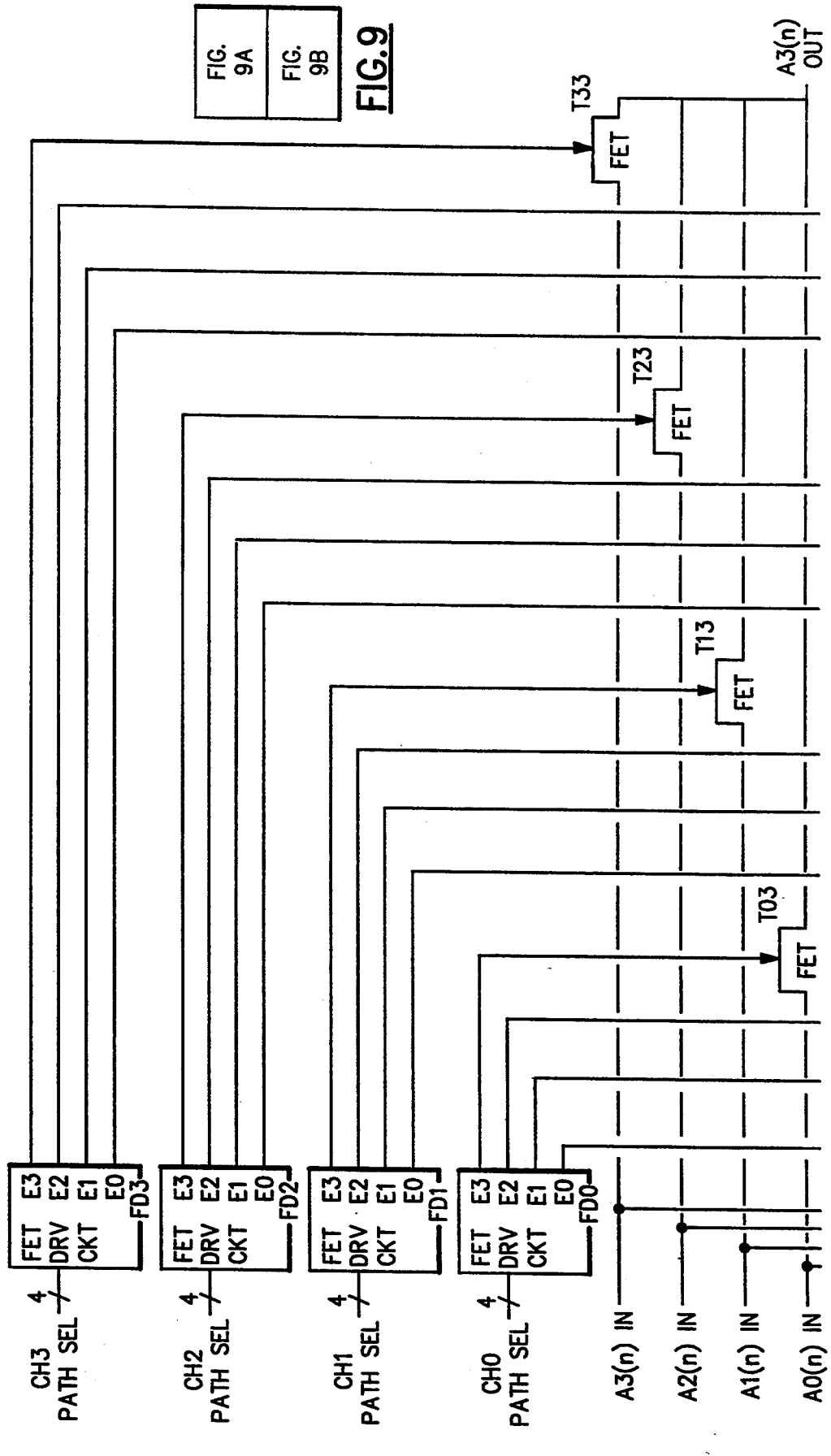

MULTI-MEDIA ANALOG/DIGITAL/OPTICAL SWITCHING APPARATUS

RELATED APPLICATIONS

The present United States patent application claims priority as a continuation-in-part application and is related to the following applications:

U.S. Ser. No. 07/677,543, filed Mar. 29, 1991, now abandoned, entitled "All-Node Switch, An Unclocked, Unbuffered Asynchronous Switching Apparatus", by P. A. Franaszek et al., and U.S. Ser. No. 07/799,497, filed Nov. 27, 1991, now abandoned, entitled "Multi-Function Network" by H. T. Olnowich, et al. and U.S. Ser. No. 07/799,602, filed Nov. 27, 1991, entitled "Multi-Media Serial Line Switching Adapter for Parallel Networks and Hererogenous and Homologous Computer Systems", by H. T. Olnowich, et al.

The present application is also related to the following applications filed concurrently herewith:

U.S. Ser. No. 07/946,196, filed Sep. 17, 1992, entitled "Switch-Based MicroChannel Planar Apparatus" by H. T. Olnowich et al, and, U.S. Ser. No. 07/946,204, filed Sep. 17, 1992, entitled "Switch-Based Personal Computer Interconnection Apparatus" by H. T. Olnowich et al, and, U.S. Ser. No. 07/947,644, filed Sep. 17, 1992, entitled "Slave MicroChannel Apparatus for Converting to Switch Architecture" by H. T. Olnowich et al, and, U.S. Ser. No. 07/946,506, filed Sep. 17, 1992, entitled "Master MicroChannel Apparatus for Converting to Switch Architecture" by H. T. Olnowich et al, and, U.S. Ser. No. 07/946,203, filed Sep. 17, 1992, entitled "Multipath Torus Switching Apparatus" by H. T. Olnowich et al, and, U.S. Ser. No. 07/946,513, filed Sep. 17, 1992, entitled "Variable Cyclic Redundancy Coding Method and Apparatus" by H. T. Olnowich et al, and, U.S. Ser. No. 07/947,010, filed Sep. 17, 1992, entitled "Signal Regeneration Apparatus for Multi-Stage Transmissions", by H. T. Olnowich et al, and, U.S. Ser. No. 07/947,023, Sep. 17, 1992, entitled "Adaptive Switching Apparatus for Multi-Stage Networks", by H. T. Olnowich et al, and, U.S. Ser. No. 07/946,986, filed Sep. 17, 1992, entitled "Priority Interrupt Switching Apparatus for Real Time Systems", by H. T. Olnowich et al, and, U.S. Ser. No. 07/946,509, filed Sep. 17, 1992, entitled "Message Header Generation Apparatus for Parallel Systems" inventors H. T. Olnowich et al.

These applications and the present application are owned by one and the same assignee, International Business Machines Corporation of Armonk, N.Y.

The descriptions set forth in the previous applications and the concurrently filed applications are incorporated by reference.

FIELD OF THE INVENTIONS

The inventions relate to multi-stage networks comprised of switching apparatus devices, and particularly to ability to send digital, analog, or optical signals through the network equally well.

The inventions also relates to digital computer systems comprised of several or many computing and/or input/output elements, and the ability of the said individual elements to perform high speed, low-latency communications with each other in a parallel fashion equally well over digital, analog, or optical signals all encompassed in a single network.

BACKGROUND OF THE INVENTIONS

In the field of parallel processing, the ability of fast and parallel communication amongst processors working on the same task is an important consideration. It is also important to be able to transmit data of various types, such as digital, analog, and optical efficiently amongst processors.

This application is directed to parallel processing, parallel switching networks, and particularly to an improved adaption of serial fiber or analog wire transmission media to parallel switching networks for the purpose of interconnecting large numbers of processors with a minimal interface. The processors can be interconnected to form a shared processing resource—a "farm" of processors—to provide either massive joint computational power for a single task or individual processors assignable to individual tasks. Corporations are beginning to view this type of "farm" approach as being very valuable. Individual workstations can be purchased and given to individual employees to support their work effort during the day. However, in the evenings or on weekends, the workstations are networked together to form a massive processing base for performing batch jobs or parallel processing. Industry is becoming aware that massive processing power can be obtained at a lower cost by investing in less expensive workstations, rather than in the traditional single large mainframe processor.

The state-of-the-art switches do not effectively meet the requirements of the versatile "farm" systems. First, they are inflexible and dictate that a single homogeneous serial transmission media and protocol be employed throughout the entire system. Secondly, they are generally switching systems designed to switch high bandwidth serial transfers or analog transmissions without regard for latency. They attack only half the problem in that they provide parallel data communication, but they do not provide for parallel path set-up through the switch. Therefore, they do not provide a full parallel network capability. Instead, all network paths share a central matrix controller function that operates in serial. If a processing node wishes to use a path through the switch, it must first arbitrate for the facilities of the central matrix controller. The matrix controller services one request at a time, causing parallel requests to wait their turn. The central matrix controller acknowledges one switch set-up request at a time. It receives a short message indicating the switch connection desired. The central matrix controller checks a matrix map stored in the central matrix controller's memory and determines whether the requested connection can be established or not. If it can, the central matrix controller sends a command to the switching element (usually referred to as the switch fabric) to make the requested connection. Then the central matrix controller responds to the requesting node telling it whether the desired connection has been made or is not available. The processing node then uses the established connection and transmits data to or from the desired destination through the switch fabric, while the central matrix controller works on establishing the next serial connection. The processing node must go through a similar procedure to break the switch fabric connection using the central matrix controller, when it is finished using a given switch path. Thus, the latency of the central matrix controller approach in regards to establishing and breaking switch paths is very poor. In existing products, this type of approach has been adequate connect DASD's and other I/O devices to computer complexes, or to send batch information between processors. These types of applications transfer long disc records or large batch data at a high bandwidth. The poor latency is amertised over the large transfer and has a small effect on the overall performance. However, this is not the case for the modern "farm" approach, where messages can be short and latency becomes as important, if not more so, as bandwith. Harold S. Stone in his book "High-Performance Computer Architecture" (Addison-Wesley 1990, pg.309) states that the performance benefits of parallel processing depends strongly on the ratio R/C, where R is the run-time of the processing (the computational work to be done) and C is the communication overhead required amongst n parallel processors jointly working on the job. The value C includes latency as well as bandwidth, and to keep C small and make parallel processing efficient, the switch latency must also be kept small.

Thirdly, another drawback of the central matrix controller switching approach is the limited number of processors that a single central controller can manage. Systems have been built to interconnect 8, 16, 32, and possibly as many as 64 processors, but that appears to be approaching the the limit of the concept. The central matrix controller approach also has a reliability problem in that a failure in the central controller can fail the entire communication system and render the whole parallel system useless.

We have solved some of the problems encountered in the prior art which we referred to above. A distributed switch controller approach, rather than a centralized approach, appears to be a better solution for parallel processing because of its inherent low latency, its ability to withstand failures, and its ability to expand to interconnecting massively parallel systems. The distributed and fully parallel switch utilized herein to solve the "farm" interconnect problem efficiently is the ALLNODE Switch (Asynchronous, Low Latency, interNODE switch), which is disclosed in U.S. Ser. No. 07/677,543 and adapted by the present invention to perform the switching of serial data lines at low latency and high bandwidths. The ALLNODE switch provides a circuit switching capability at high bandwidths similar to the switch fabric in the central matrix controlled switches; however, the ALLNODE switch includes distributed switch path connection set-up and teardown controls individually within each switch—thus providing parallel set-up, low latency, and elimination of central point failures. We will further describe in the detailed description a way whereby the ALLNODE switch and the present invention can be used to solve the "farm" problem effectively.

This application builds on the basic ALLNODE Switch invention as disclosed in U.S. Ser. No. 07/677,543, which is adapted by the present invention to perform the low latency switching of analog and optical data lines, as well as standard digital data lines.

SUMMARY OF THE INVENTIONS

The invention is a switching apparatus for interconnecting multiple processors or other functional elements and enabling the said elements to send digital, analog, or optical signals between any two elements. The media is fully parallel and supports n such transmissions simultaneously, where n is the number of functional elements interconnected by the switching network. Any of the n simultaneous transmissions can be digital, analog, or optical in any proportion.

The switching means is an expansion of the basic digital asynchronous and unbuffered switching concept disclosed in U.S. Ser. No. 677,543, the ALLNODE Switch. The ALLNODE switch permits connection control and data transfer between elements to occur over a common and small set of point-to-point, digital, interconnecting wires. The present inventions expands this digital base to not only be used for digital transmissions, but to also be expanded to serve as a distributed controller for the purpose of controlling analog, optical, or any other type of transfer between elements of the system.

The invention apparatus has many near term applications, such as the switching of common analog based signals including TV signals, radar scanners, modem outputs, telephone lines, etc. from a single source to any node of the system including different processors, I/O devices, or displays. The analog links can also accept serial digital protocols which are not in the form used by the basic switching apparatus; these protocols can be transmitted as is without revision through the analog switch and allow heterogenous systems to communicate via serial digital transmissions over the analog paths. In addition, the switching apparatus can also be used as a distributed switch controller to control optical and other types of non-digital switches.

The invention apparatus further provides a switching network communication structure that has the characteristic of simplicity of implementation, and does not require data buffering or data conversion of any kind. It establishes or breaks connections multiple connections (digital, analog, optical, etc.) instantaneously and is, therefore, dynamically changeable with a very quick response time. It has the capability of resolving requests to establish connections in a parallel manner, where N connections can be established or broken at the same time (where N=the number of elements of the system which are communicating via the switching network). Thus, the number of connections that can be made or broken simultaneously scales directly with the size of the system. This capability enables the invention apparatus to handle multiple shod messages very efficiently. In addition, the new apparatus is devoid of synchronization requirements or wire length restrictions. It also has the ability to track the speed improvements of new technologies and to increase performance as the technology used to implement the invention apparatus improves.

In addition, the new switching apparatus can be cascaded with other identical invention apparatus devices to form interconnection networks among any number of system elements or nodes. Said network would have the characteristics for full parallel interconnection.

DETAILED DESCRIPTION OF THE PREFERRED EMBODIMENTS

Figure 1:
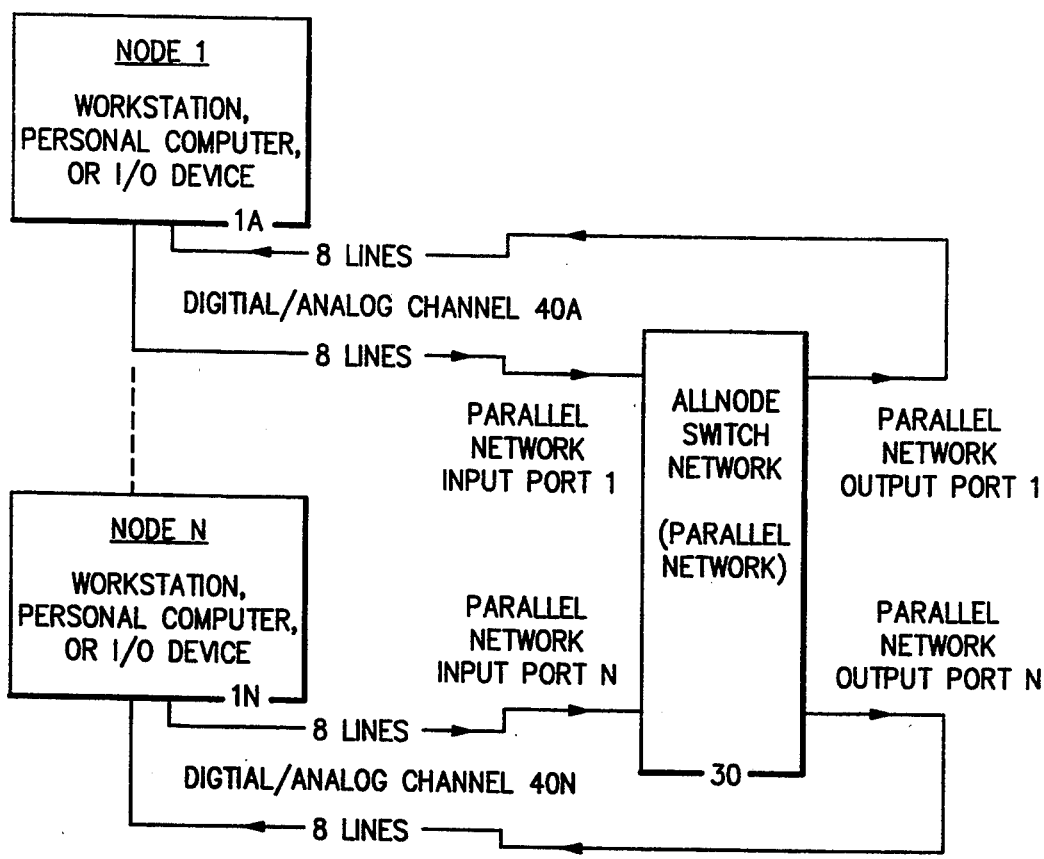
FIG. 1 illustrates generally our preferred embodiment of the present invention of a Multi-Media Analog/Digital/Optical Switching apparatus, which has the capability of interconnecting multiple analog, digital, and optical channels through a parallel switching network.

Turning now to the drawings in greater detail, as illustrated by FIG. 1, showing the preferred method of interconnecting N nodes via digital and analog data channels connected to a parallel multi-stage switching network comprised of the present invention switching devices. Each node 1 of a parallel system can be comprised of a workstation, personal computer, mainframe CPU, or any I/O device, such as a DASD. A typical node 1A connects to the parallel network over a proprietary digital and analog data channel 40A, which is herein disclosed.

The preferred embodiment uses only unidirectional interfaces, and therefore FIG. 1 shows the digital and analog data channels 40A to be comprised of two unidirectional lines, one carrying data from node 1A, and one carrying data to node 1A. It is possible for any node to send digital or analog data to any other node through switch network 30. For example, node 1A could send a digital message or analog waveform into network 30 by using data channel 40A. Every transmission of digital and/or analog data to the network 30 must include a digital control header, which is used to command the switch network 30 to make the connection to the requested destination node (node 1N in our example). Switch network 30 forms the requested connection and then digital messages and/or analog waveforms can flow through network 30 from 1 node to the selected destination node. In similar fashion any node can communicate with any other node through network 30.

Figure 2:
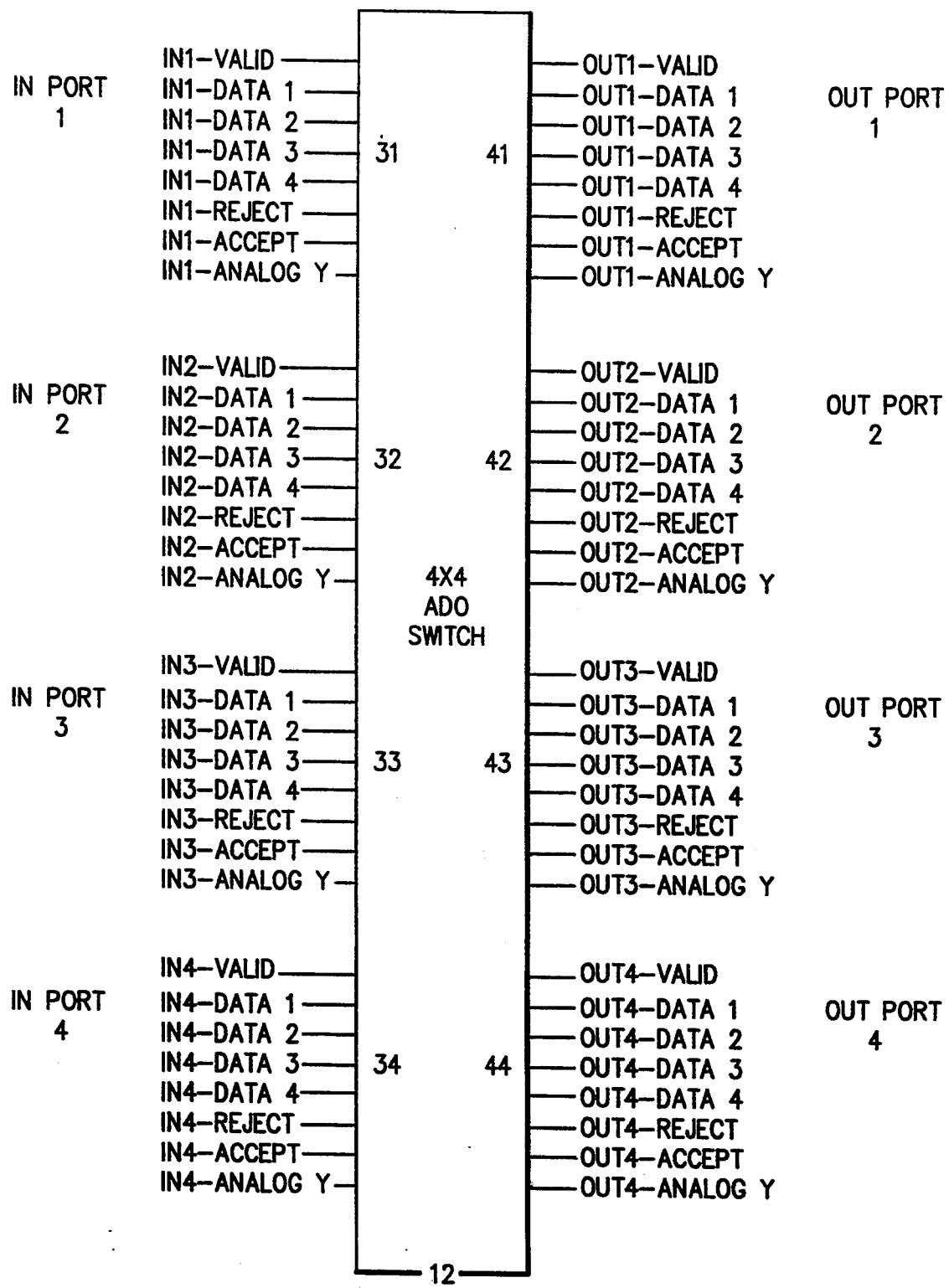
FIG. 2 illustrates a four input and four output (4×4) crossbar switching apparatus, which has the capability of providing the disclosed fully parallel switching means for interconnecting analog and digital signals for up to four nodes.

Referring to FIG. 2, the preferred embodiment is a 4×4 switching apparatus 12, where the function of the present invention is to provide a means of connecting any of 4 sets of digital, analog, or optical inputs on a mutually exclusive basis to any one of the unused 4 output ports. The 4×4 switching apparatus 12 can support up to 4 simultaneous connections at any given time. For instance, Input 1 could be connected to Output 3, Input 2 to Output 4, Input 3 to Output 2, and Input 4 to Output 1.

The invention switching apparatus 12 is unidirectional, which means that data flows in only one direction across the said switching apparatus 12, that being from input to output. Switching apparatus 12 interfaces are defined in detail in FIG. 2. The set of lines 31, 32, 33, and 34 at each in-port to the switching apparatus 12 are identical in number and function to the set of lines 41, 42, 43, and 44 at each out-port. The sets of interface lines to each input and output port contain seven+Y unique signals: 4 digital data lines, 3 digital control lines (VALID, REJECT, and ACCEPT), and Y signals carrying analog data. The signals at each port are differentiated by a prefix of INX- or OUTX-indicating the direction and number of the port (X) that they are associated with. The four digital data and one VALID lines and Y analog lines have a signal flow in the direction going from input to output across switching apparatus 12, while the digital REJECT and ACCEPT control lines have a signal flow in the opposite direction.

The Switch Interface requires only 8 signals, as shown in FIG. 2, to transmit and control digital and/or analog data through the network 30—the digital data and control transfer width is ½ byte (4 bits) at a time. The signals required are:

DATA: 4 parallel signals used to command switch connections and transmit digital data messages or digital control headers.

VALID: When active, indicates that a digital message, control header, or analog waveform is in the process of being transmitted. When inactive, indicates a RESET command and causes all switches to reset to the IDLE state.

REJECT: Signal flow is in the opposite direction from the DATA and VALID signals. When active, it indicates that a REJECT or error condition has been detected.

ACCEPT: Signal flow is in the same direction as the REJECT signal. When in the low state, it indicates that a message is in the process of being received and checked for accuracy. When active, it indicates the message has been received correctly.

ANALOG Y—Is a single analog signal or a group of Y analog signals that carry unidirectional analog waveforms in the same direction as the DATA and VALID signals through the invention switching apparatus.

It is here understood that the FIGS. 3 to 8 are illustrations which are common to U.S. Ser. No. 07/677,543, the parent application which is incorporated herein by reference as to all of its contents. FIGS. 3 to 8 refer to a 4×4 crossbar implementation of the ALLNODE Switch to illustrate the principles and speed of the switching concept.

Figure 3:
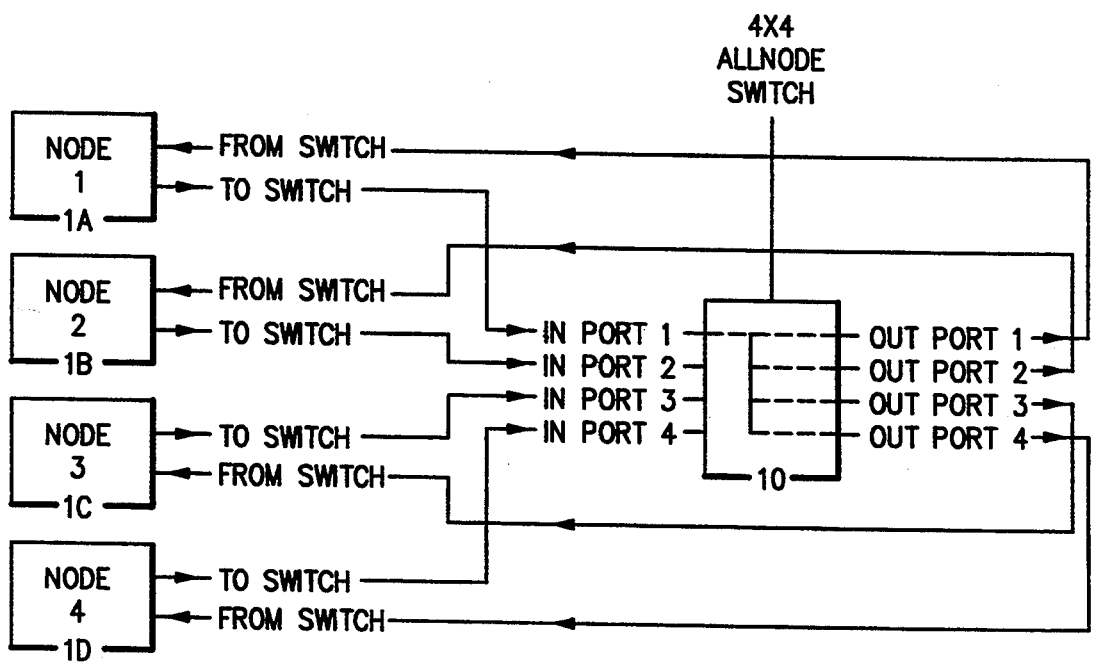
FIG. 3 illustrates the interconnections required to a four input and four output (4×4) crossbar switching apparatus to provide full interconnection amongst four nodes.

As illustrated by FIG. 3 the ALLNODE switching apparatus would be provided for a node having a plurality of input and output ports, and would comprise the connection control circuit for each input port, and a multiplexer control circuit for each output port for connecting any of I inputs to any of Z outputs, where I and Z can assume any unique value greater or equal to two, as in the parent application.

FIG. 3 shows a 4×4 crossbar ALLNODE switching apparatus, where the ALLNODE switching apparatus 10 is unidirectional, which means that data flows in only one direction across the said switching apparatus 10, that being from input to output. Although the said switch apparatus 10 is unidirectional, it supports bidirectional communication amongst four nodes (20, 22, 24, and 26) by connecting the 4×4 ALL-NODE switching apparatus 10 as shown in FIG. 3. Each node 20, 22, 24, and 26 has two sets of unidirectional interconnecting wires, one going to the switch 10 and one coming from the switch 10. The dashed lines internal to the switching apparatus 10 indicate that the function of the said switching apparatus is to connect an input port such as INPUT PORT 1 to one of four possible output ports. The switching apparatus 10 provides exactly the same function for each input port, allowing it to be connected to any unused output port.

Figure 4:
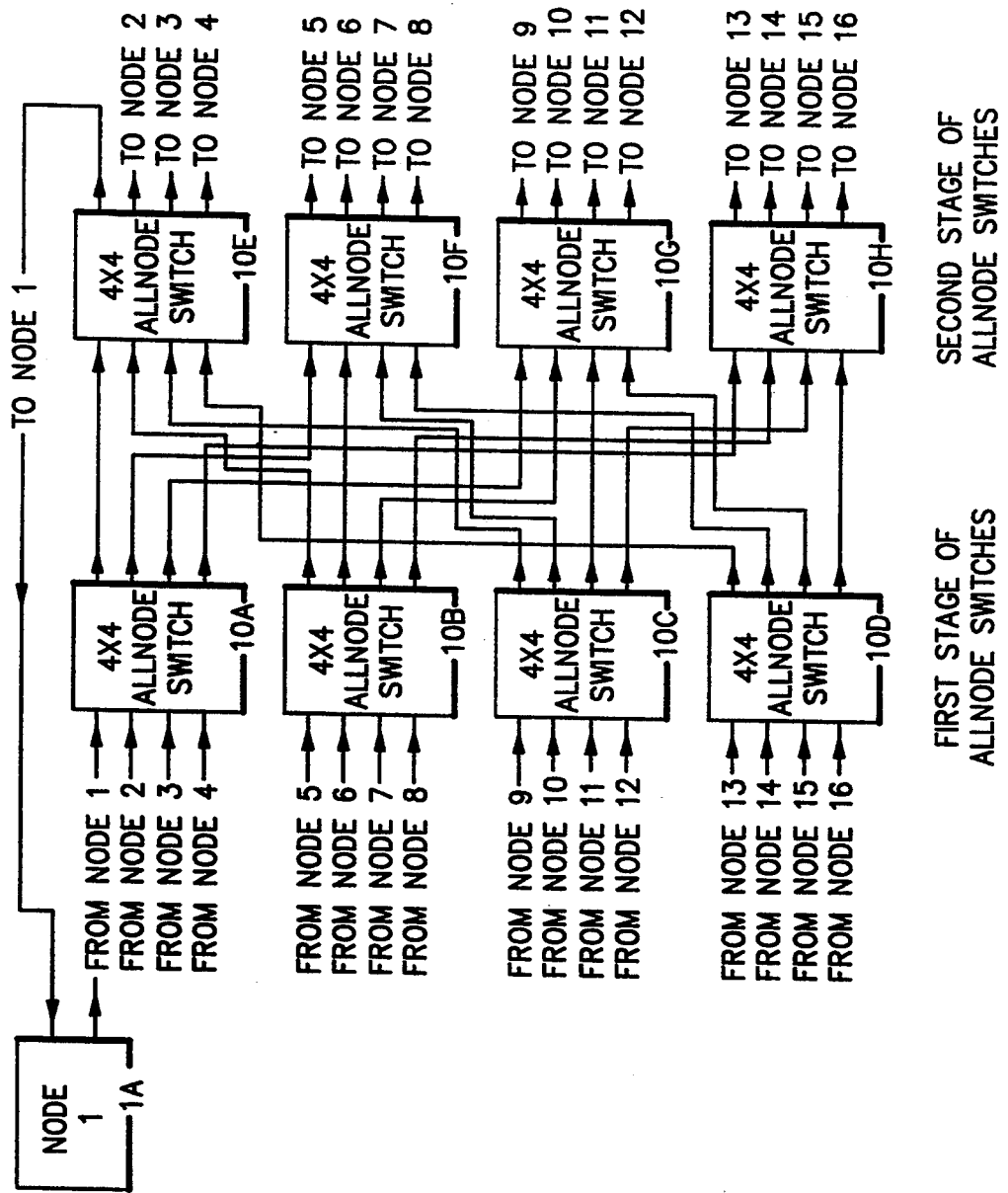
FIG. 4 shows a typical method for cascading the 4×4 disclosed embodiment of the invention switching apparatus to accommodate systems having more than 4 nodes.

Referring to FIG. 4, a method is illustrated for increasing the number of nodes in a system by cascading eight switching apparatus 10 blocks. The eight cascaded switches are denoted as 10A through 10H to indicate that they are identical copies of switching apparatus 10, varying only in regards to the wiring of their input and output ports. It can be noted that any of sixteen nodes can communicate to any other node over a connection that passes through exactly two of the switching apparatus 10 blocks. For instance, Node 5 can send messages to Node 15 by traversing switch 10B and switch 10H. Since all connections are made through two switching apparatus 10 blocks, the network comprised of the eight switching apparatus 10 blocks is referred to as a two stage switching network. Other multi-stage networks can be configured from switching apparatus 10 blocks by using three stages, four stages, etc. in a similar manner.

Figure 5:
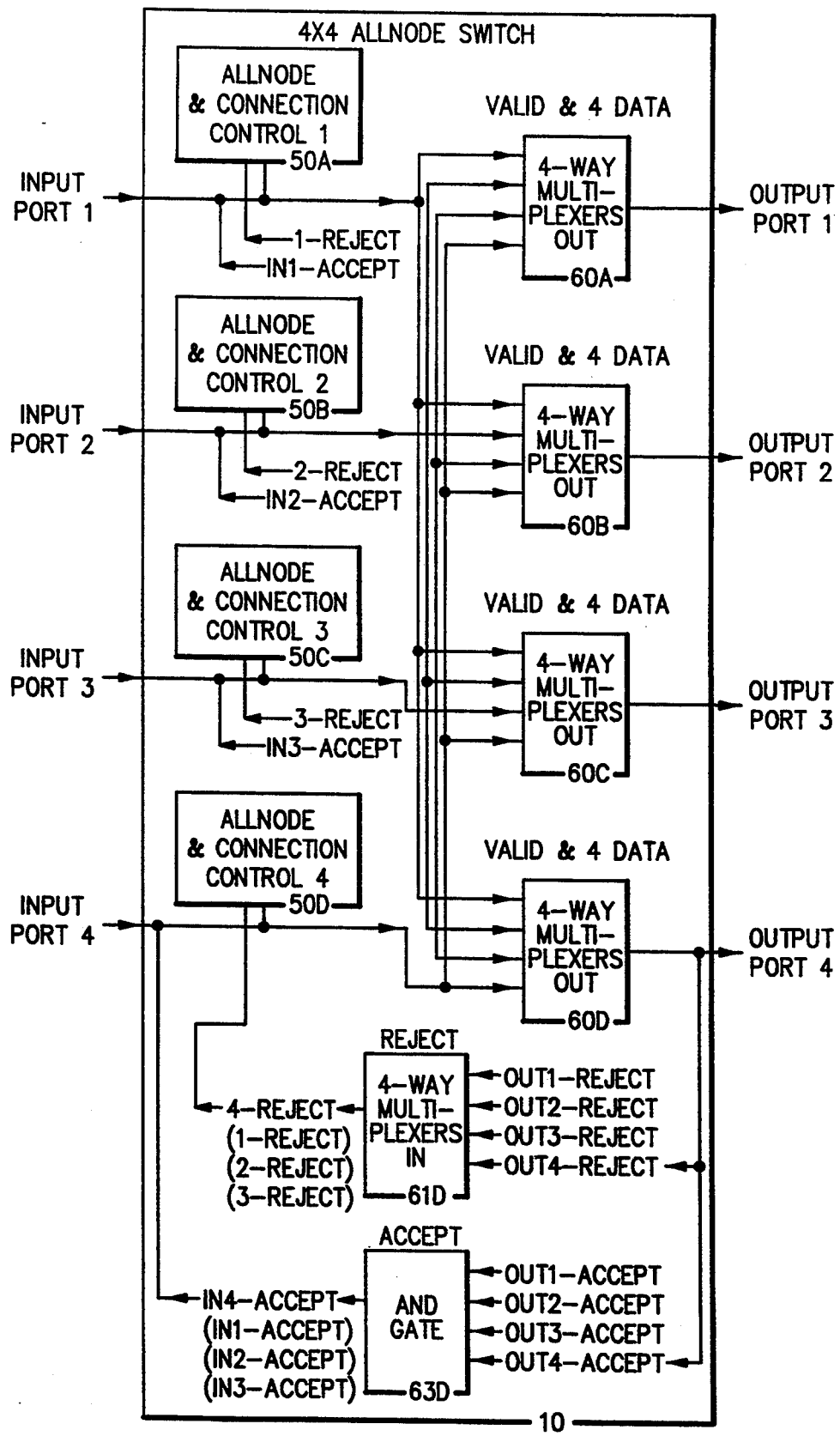
FIG. 5 shows a schematic block diagram of the simple digital data flow and control path implementations of the 4×4 crossbar switching apparatus, which has the capability of being used with the present invention to provide fully parallel switching means for interconnecting up to four system nodes for the purpose of transferring digital data. Previously disclosed in the prior parent application U.S. Ser. No. 07/677,543.

Referring to FIG. 5, a functional diagram of the simple data flow across ALLNODE switching apparatus 10 is illustrated. The VALID and four data lines at each input port, inside the switch, and at each output port are represented by a single line in FIG. 5 for simplicity. For instance, the VALID and four data lines entering switch 10 at IN PORT 1 go to five internal functional blocks of switching apparatus 10; these are blocks 50A, 60A, 60B, 60C, and 60D. Block 50A makes the decision as to which of the four possible output ports are to be connected to input port 1. The VALID and four data lines from each input port go to each output multiplexer block (60A, 60B, 60C, and 60D); this makes it possible to connect any input port to any output port. Each of the four output multiplexer blocks (60A, 60B, 60C, and 60D) is uniquely commanded from each of the control blocks (50A, 50B, 50C, and 50D) as to which of the four possible sets of input port lines is to be gated through to each output port. For instance, control block 50A can command multiplexer 60C to connect input port 1 to output port 3; control block 50B can command multiplexer 60A to connect input port 2 to output port 1; and control block 50C can command multiplexers 60B and 60D to connect input port 3 in a multi-cast fashion to output port 2 and output port 4. All three connections are capable of being established simultaneously or at different times. At the same time that multiplexers 60A to 60D form connections to move the VALID and data signals across switch 10 with a unidirectional signal flow from input port to output port, multiplexer 61D and AND gate 63D form signal connections for the REJECT and ACCEPT signals, respectively, with a signal flow in the opposite direction of output port to input port (typical implementations are shown by blocks 61D and 63D—similar blocks are associated with each input port). These REJECT and ACCEPT signals provide a positive feedback indication to switch 10 of actions taken either by subsequent switch 10 stages in a cascaded network or by the device receiving and interpreting the VALID and four data signals. A control header or digital message being transmitted through switching apparatus 10 over the four data signals under control of the VALID signal can be REJECTed by any network stage if it is unable to establish the commanded connection or by the receiving device if it is not capable of receiving the message at this time or if it detects an error in the transmission. The receiving device also has the capability of confirming the correct arrival of a command or message (without errors being detected) by pulsing the ACCEPT signal. Since the REJECT and ACCEPT signals go in the opposite direction from the data flow, they provide a means of reporting back a positive indication to the sender on whether the attempted transmission was received correctly or rejected.

Figure 5A:
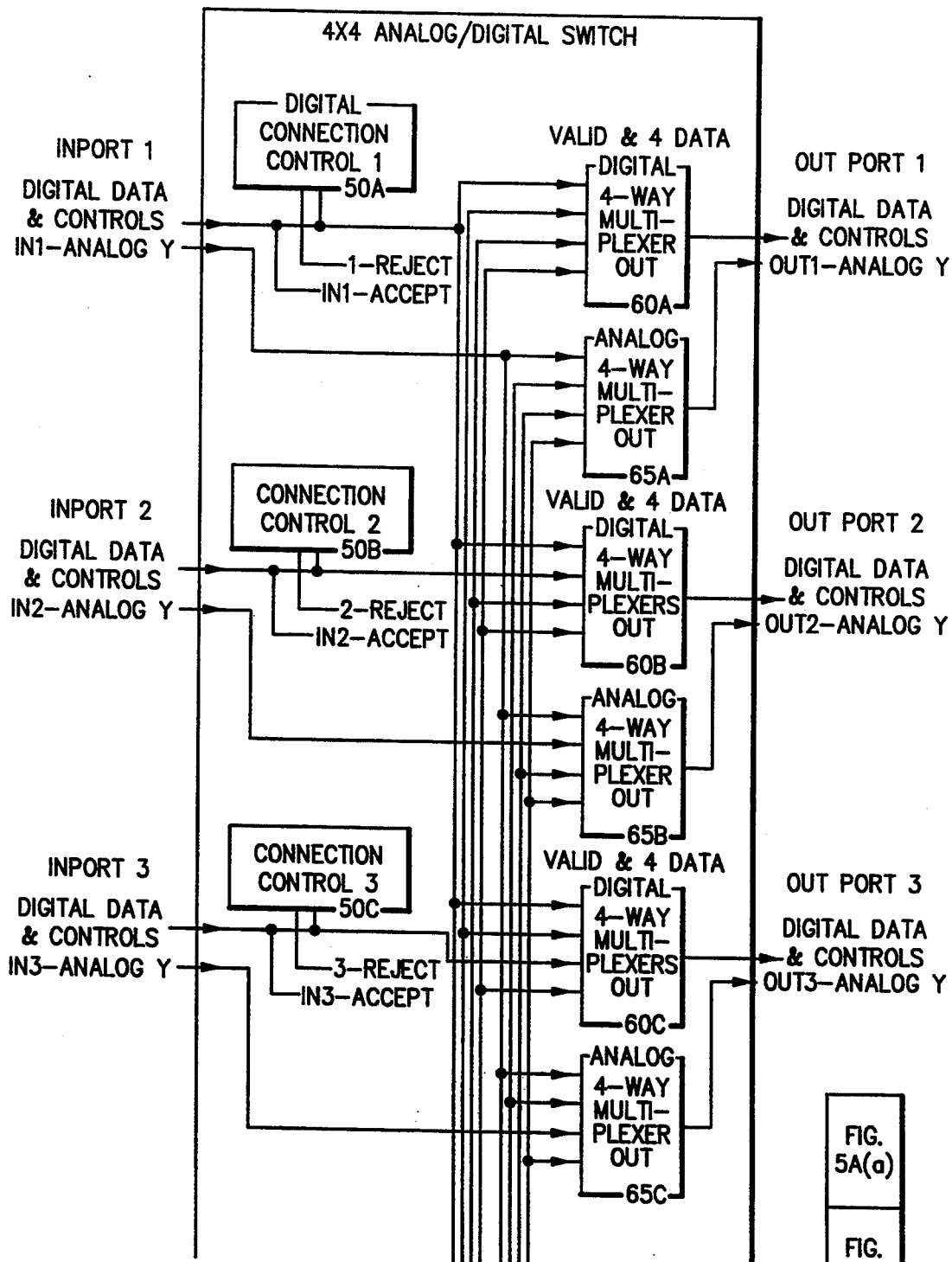
FIG. 5A shows a schematic block diagram of the simple data flow and control path implementations of the 4×4 disclosed embodiment of the invention switching apparatus to provide for the routing of analog signal through the invention switching apparatus.
Figure 5A:
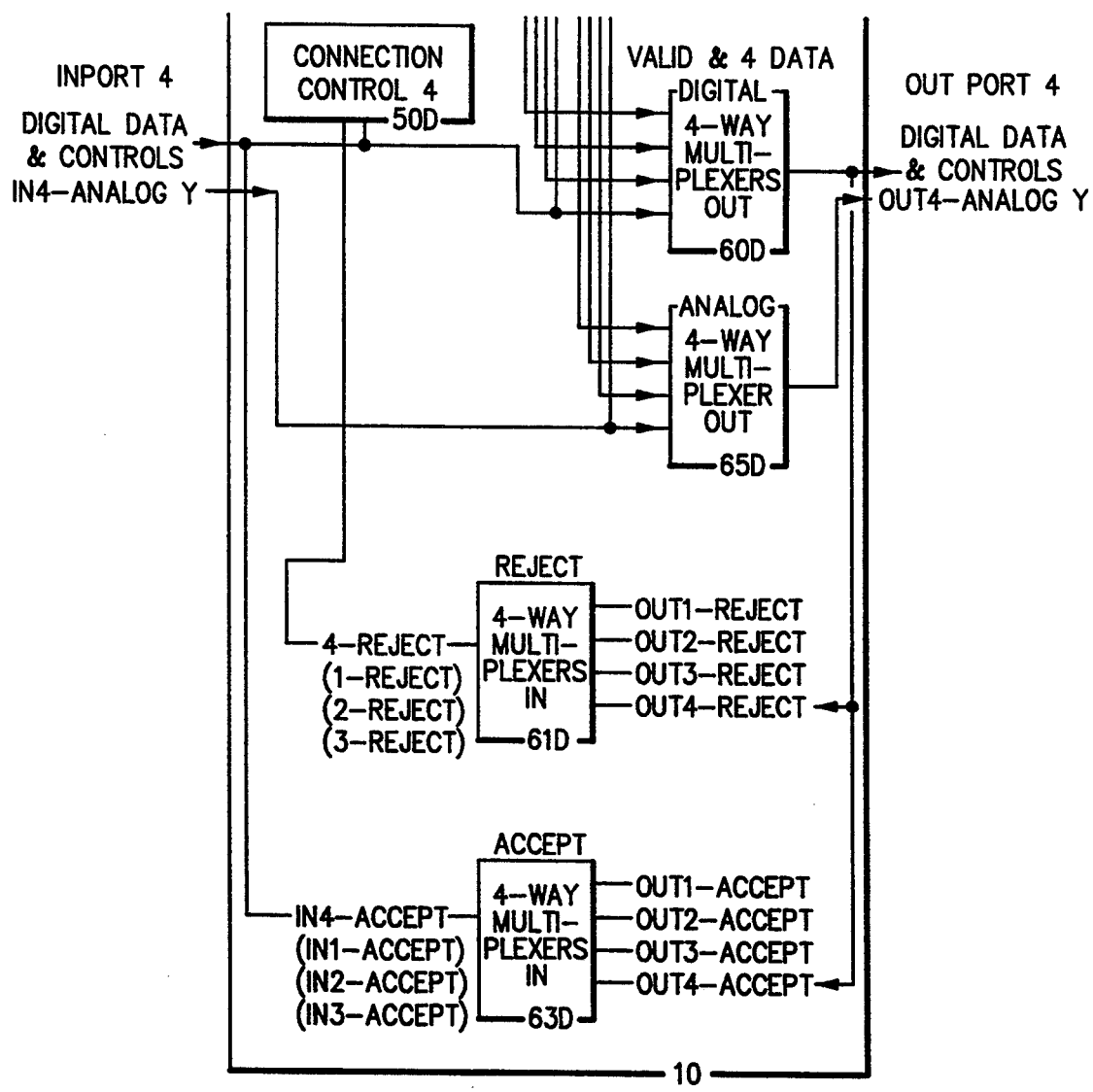

Referring to FIG. 5A, it is shown how the parent invention of FIG. 5 is expanded to implement the present invention by adding analog output multiplexer blocks 65A, 65B, 65C, and 65D to each switch output port. The analog Y lines from each input port go to each analog output multiplexer block (65A, 65B, 65C, and 65D); this makes it possible to connect any input port analog signals to any output port analog signals. Each of the 4 analog output multiplexer blocks (65A, 65B, 65C, and 65D) is uniquely commanded from each of the control blocks (50A, 50B, 50C, and 50D) by the exact same signals that command the 4 digital output multiplexer blocks (60A, 60B, 60C, and 60D). This makes an analog selection of which of the 4 possible sets of input port analog Y lines are to be gates through to each output port. For instance, control block 50A can command multiplexers 60C and 65C to connect input port 1 to output port 3 both, control block 50B can command multiplexers 60A and 65A to connect input port 2 to output port 1, control block 50C can command multiplexers 60D and 65D to connect input port 3 output port 4, and control block 50D can command multiplexers 60B and 65B to connect input port to output port 2. All four connections are capable of being established simultaneously or at different times. Note, that it is possible to combine both analog and digital multiplexers in the same chip and produce a single chip capable of performing both tasks. Either a digital message or analog waveform being transmitted through switch 12 can be REJECTED by any switch 12 stage, if it is unable to establish the commanded connection, or by the receiving device if it is not capable of receiving the message at this time or if it detects an error in the transmission.

Figure 6:
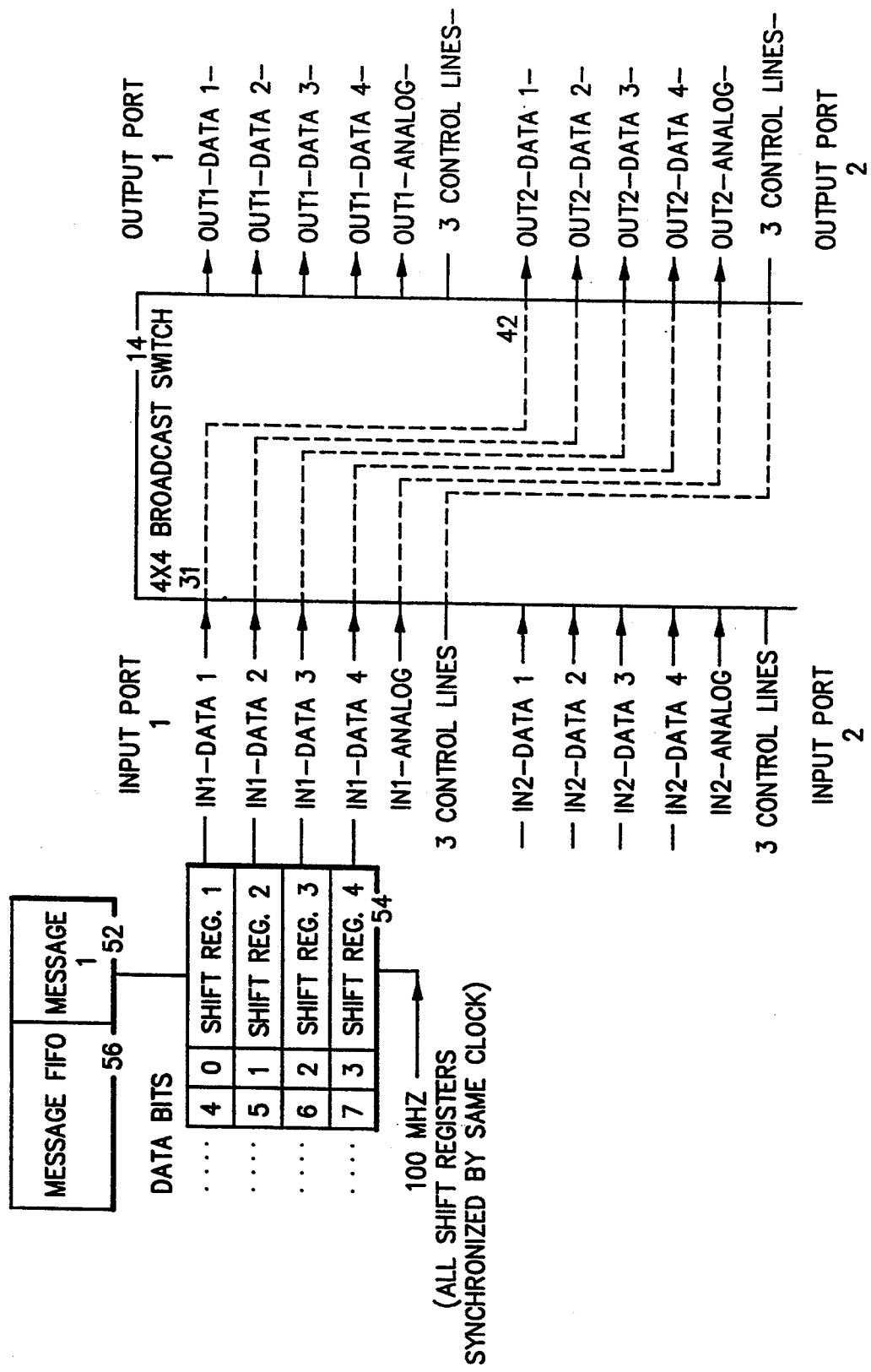
FIG. 6 illustrates a typical method for generating parallel control and and multiple line serial digital data information to be sent to the 4×4 prior parent embodiment of the invention switching apparatus over four synchronous data lines.

Referring to FIG. 6, blocks 56, 52, and 54 illustrate a typical method for generating multi-line (parallel)-/serial digital data in the form of a message which can be transmitted to and across switching apparatus 14, which is a partial drawing of the switching apparatus 12. Similar parallel/serial data generation logic as provided by 56, 52, and 54 can be used at each of the other input ports to switching apparatus 12. Each set of input data lines provides 4 serial data lines to a given input port which is synchronized to the same clock by the four shift registers 54 which create the parallel/serial data by shifting four synchronized lines of data 31 as controlled by the same identical clocking signal (100 MHZ in FIG. 6). However, the four different input port sources (31, 32, 33, and 34) to switching apparatus 14 can be asynchronous to each other, being based on different, non-synchronized, 100 MHZ clocking signals.

The process for sending parallel/serial messages through switching apparatus 14 involves FIFO 56, which accumulates data messages to be transmitted. The next entire message to be transmitted is moved to buffer 52. The message stored in buffer 52 is moved to shift registers 54 in preparation for transmittal and the data is dispersed across the four shift registers 54 by placing data bit 0 into the first bit of shift register 1, data bit 1 into the first bit of shift register 2, data bit 2 into the first bit of shift register 3, data bit 3 into the first bit of shift register 4, data bit 4 into the second bit of shift register 1, etc. Shift registers 54 then begin to send serial data to switching apparatus 14 over four synchronized data lines, in such a manner that the parallel/serial data flows continuously until the entire message has been transmitted. The switch apparatus 14 uses the first eight bits transmitted (in the first two clock cycles of serial data over interface 31 from serial registers 54 to switching apparatus 14) to select and establish a connection path through the switching apparatus 14. The example in FIG. 6 illustrates via dashed lines, the switching apparatus establishing a temporary connection between input port 1 (31) and output port 2 (42), such that each of the eight individual lines in interface 31 are uniquely and directly connected to each of the corresponding lines in interface 42.

Figure 7:
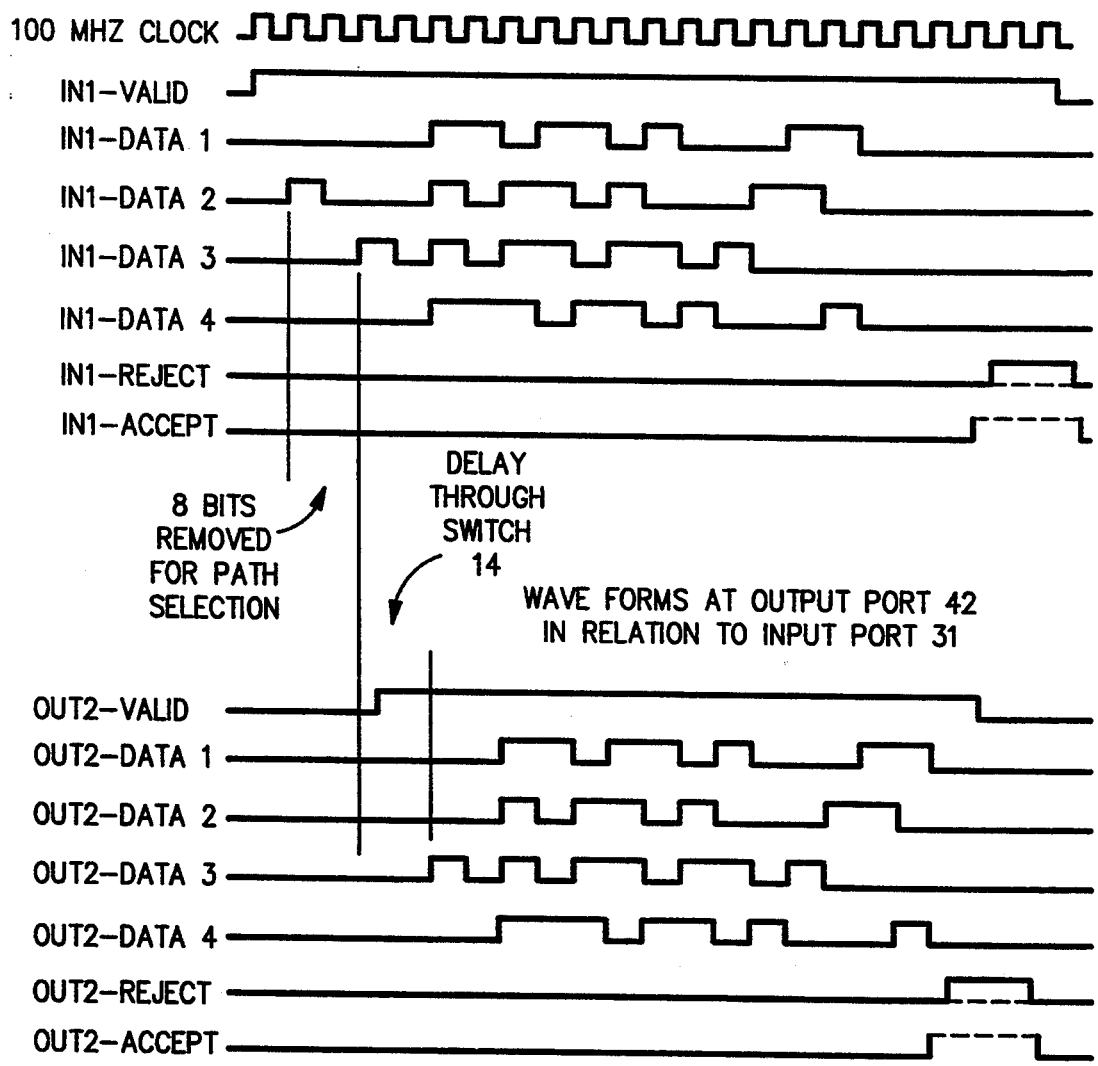
FIG. 7 shows a typical timing diagram for routing the digital interface signals arriving at one input port of the 4×4 prior parent embodiment of the invention switching apparatus to one output port.

Referring to FIG. 7, typical serial waveforms are shown for both input and output ports of the switching apparatus 14. The switch removes the first 8 bits of the serial transmission as sent by shift registers 54 and uses them to make and hold a connection, such as interface 31 to interface 42. The remainder of the serial message in our example is transferred directly from interface 31 to interface 42, so that interface 42 sees that exact same message that interface 31 receives, minus the first 8 bits and delayed by the circuit delays encountered by the serial data as it traverses the switching apparatus 14. Switching apparatus 14 does not buffer or re-clock the serial data entering via interface 31 in any manner; it merely reflects as quickly as possible the input waveforms it receives over interface 31 to output interface 42 without changing them in any way, except to strip off the first 8 bits.

The convention for indicating to a switch 14 input port over an interface (such as 31) that there is no transfer in progress, is to issue continuous IDLE commands, which are denoted by the 4 data lines and the VALID control line being held at logical 0's. The detection of a logical 1 on any of the input lines will signify the departure from the IDLE state and signify to the switch that a selection and transfer is beginning. Likewise, the output lines from the switch will be held in the IDLE state (at all 0's), when there is no active transfer in progress.

In general, all switches require a path selection method, whereby they are commanded which connection (input port to output port) to establish. For switching apparatus 10, the path selection command is transmitted to the switch over the same interface that the data is transferred; i.e., the 4 data lines associated with each input port. Selection information must be transferred prior to the data, so that the commanded interconnections can be established and the data can then flow to the commanded destination. The selection information need NOT identify an input port number (1 to 4), because it is arriving at the switch over a specific input and the switch already knows what input number it is receiving data on. Therefore, the selection information need ONLY specify the number (1 to 4) of which one of the four output ports of switching apparatus 10 to which to connect. The method of path selection recommended here is one out of N encoding with a return to zero (called a DEAD FIELD).

Figure 8:
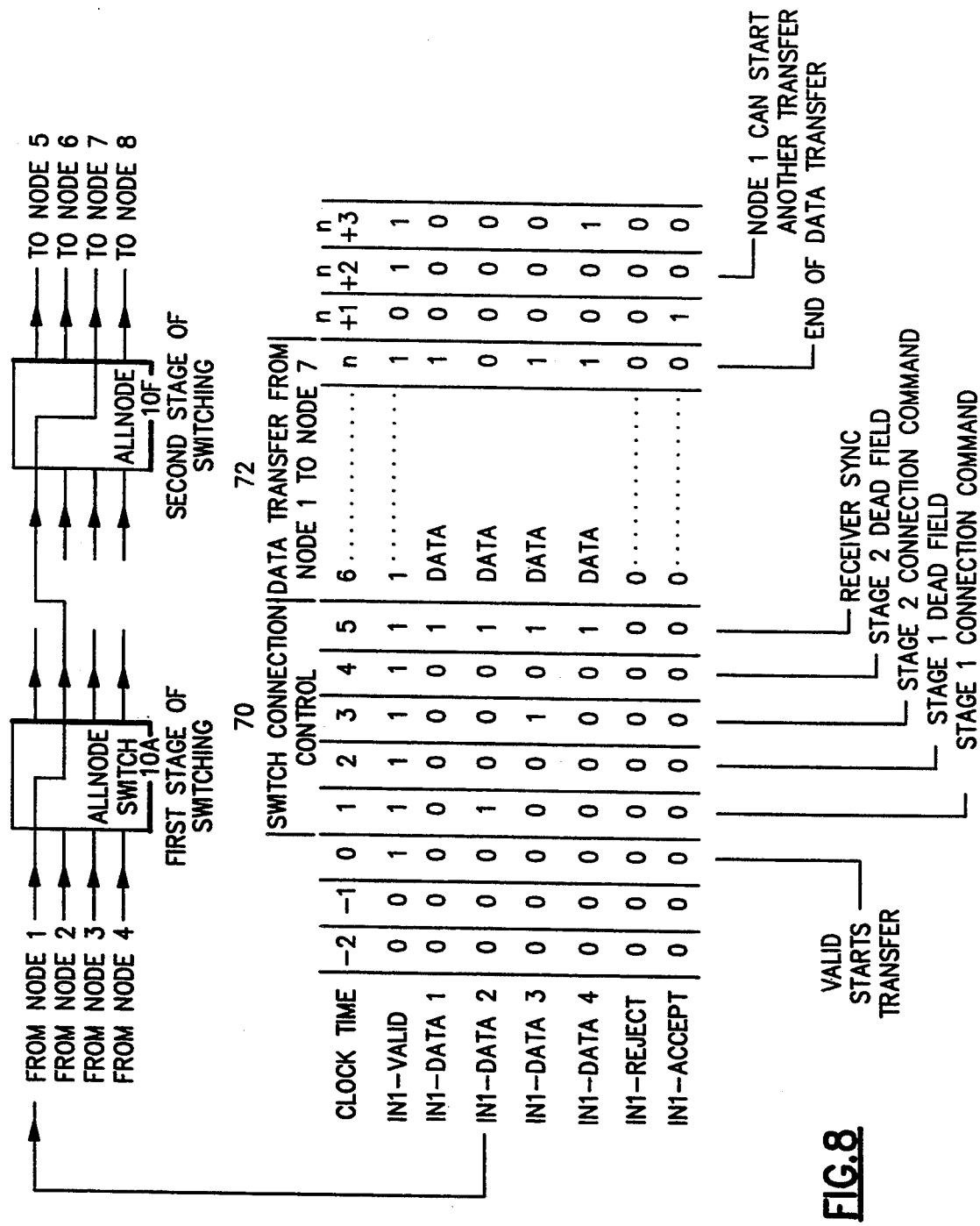
FIG. 8 illustrates the typical method of selecting and establishing a transmission path through a network comprised of the invention switching apparatus for the purpose of sending digital data from one node to another.

Referring to FIG. 8, a typical example of the exact serial bit patterns and control signal activation is shown for sending control and digital data information to switching apparatus 10. The example references the cascaded, two stage switching network shown in FIG. 4 and involves sending data across the network from node 1 through switching apparatus 10A and 10F to node 7. To make this connection, input port 1 must be connected to output port 2 of the first stage switching apparatus 10A, and input port 1 must be connected to output port 3 of the second stage switching apparatus 10F. The signal sequence that is sent to input port 1 to cause the desired connections in switching apparatus 10A and 10F is shown in FIG. 4. In the signal sequence of 1's and 0's, time advances from left to right, so that the values seen at clock time −2 arrive at switch 10A first, and the values at clock time −1 arrive second, etc. The values of the IN1-DATA and IN1-VALID lines are all zeroes and cause nothing to happen at switch 10A during times −2 and −1, because they indicate IDLE. At clock time 0, the IN1-VALID line goes to a logical 1. This prepares switch 10A by enabling the input port 1 to receive data, but no connection or action takes place at switch 10A at this time. The IN1-VALID control line basically enables the corresponding switch input port; when IN1-VALID is a logical 0, switch 10A cannot make any connections or receive any data from input port 1, which is held RESET. Finally, at clock time 1, switch 10A receives its command as to what output port to connect to; the command is received entirely during clock time 1.

The command bit pattern sent at clock time 1 is used by switch 10A to establish connection to an output port; this process is referred to as a path selection operation and takes place completely internal to switch 10A. The path selection approach implemented by the present ALL-NODE switch invention is to let each of the 4 IN1-DATA lines to define a unique output of switch 10A to be selected. For instance, IN1-DATA1 signal going to a logical 1 at time 1 tells switch 10A to connect to output port 1, IN1-DATA2 commands connection to output port 2, etc. In our example, since IN1-DATA2 goes to a logical 1 during clock time 1, switch 10A is thereby commanded to connect to output port 2. In other words, the connection algorithm is that the first data input line going to a logical 1 after an input port has been enabled, defines the connection which that input port is to make. This is a mutually exclusive process, in that for the normal case only one data line at clock time 1 is allowed to be a logical 1; the other 3 data lines must be 0's. Note that since 1 bit of selection information is guaranteed to be a logical 1, switch 10A will be able to recognize the start of a transmission without requiring any additional bits to signify that a transfer is commencing. The switch 10A makes the commanded connection by removing the 4 bits from the data lines and storing them in a selection register in control block 50A of FIG. 8. The bits transmitted during clock time 1 are not passed through switch 10A to switch 10F, but instead switch 10A begins passing the very next 4 bits of data corresponding to clock time 2 to the next switch 10F. However, the information bits following a selection command (those transmitted by the 4 data lines at clock time 2 in our example) must always be all zeroes (a DEAD FIELD) as shown in FIG. 8. The purpose of this will be explained subsequently.

At clock time 2, the connection of switch 10A input port 1 to output port 2 is established and causes the signal sequence at clock time 2 to be transmitted across switch 10A and the interconnecting wires to switch 10F input port 1. From this time on, switch 10A merely transmits all subsequent data immediately to switch 10F input port 1; it never examines or takes any action on any other data patterns presented to switch 10A over its input port 1 interface. It just passes all data patterns it receives over input port 1 immediately to the output port 2 and switch 10F. Thus, at clock time 2, assuming zero delay across switch 10A and its associated cable, switch 10F input port 1 sees the VALID signal rise and the all zeroes DEAD FIELD on the 4 data lines coming into switch 10F input port 1. In this way, at time 2, switch 10F input port 1 is enabled in an identical manner to the way switch 10A input port 1 was enabled previously at time 0.

In our example, IN1-DATA3 goes to a logical 1 during clock time 3 and switch 10 F is thereby commanded to connect its input port 1 to its output port 3, in a manner similar to the way switch 10A was commanded to connect its input port 1 to its output 2 during clock time 1. The switch 10F in making the commanded connection, removes the 4 bits at clock time 3 from the data lines, and stores them in the selection register which is part of control block 50A of FIG. 5. The bits transmitted during clock time 3 are not passed through switch 10F to Node 7, but instead switch 10F begins passing the very next 4 bits of data corresponding to clock time 4 to Node 7. However, the information bits following a selection command (those transmitted by the 4 data lines at clock time 4 in our example) must always be all zeroes (a DEAD FIELD) as shown in FIG. 8. Thus, by clock time 4, switches 10A and 10F have established a connection path for transferring data directly from Node 1 to Node 7. Up to clock time 5, Node 7 sees nothing but IDLE commands. At time 4, Node 7 sees the OUT3-VALID line from switch 10F go active and is thereby enabled to start receiving data at time 5. From time 5 on, Node 7 can receive data from Node 1 over the 4 OUT3-DATA lines from switch 10F. The protocol of the actual data being transmitted can be any of the normal formats such as manchester encoded, 8/10 bit encoding with preamble, etc. However, the preferred embodiment, as shown in FIG. 8 is an all ones synchronization field at time 5, followed by the NRZ data message. The data message can specify the word count length of the transfer. The purpose of the synchronization field of all ones as a prefix to the actual data message, is to enable the receiving node 7 to synchronize to the sending node 1 in one clock time. This assumes that the two nodes involved in the data transfer have clocking systems that are asynchronous to each other, but are operating at the same frequency within a specified tolerance.

The preferred embodiment is to transmit the word count length of the message first during clock time 6 and clock time 7. Node 7 then decrements the length count and can detect when the transfer is complete. Node 7 can then check the message for accuracy using the selected error detection method (parity, ECC, or CRC). If the message has been received correctly, Node 7 responds by activating the ACCEPT interface line back to switch 10F at clock times n+1 and n+2. Switch 10F passes the ACCEPT indication back to switch 10A, which in turn returns it immediately to Node 1. This indicates to Node 1 that the transfer completed successfully, and Node 1 resets its VALID and 4 data lines to switch 10A to zeroes, thus, completing the data transfer and returning to the IDLE state. The IN1-VALID input line to switch 10A going to a zero at time n+3, causes switch 10A input port 1 to break its connection to output port 2 and to return to the IDLE state. Immediately, switch 10F sees its IN1-VALID input line go to a zero, breaks its connection to output port 3 and returns to the IDLE state. Thus, the connections can be broken and the switches returned to IDLE in as little as one clock time. If Node 1 has another message to transmit, it can load the next message into buffer 52 and shift registers 54 (FIG. 6), and begin transmission to Node 7 or any other node as soon as time n+4. The only restriction is that the VALID signal generated by Node 1 must return to zero for a minimum of one clock time (time n+3) to signify the end of one transfer before beginning another.

If Node 7 finds an error in the message it has received after the word count has gone to zero at clock time n, it responds by activating the REJECT interface line (instead of ACCEPT) back to switch 10F. Switch 10F uses the incoming REJECT signal from Node 7 to break its connection to Node 7, to return to the IDLE state, and to pass the REJECT indication back to switch 10A, which in turn returns it immediately to Node 1 after breaking its connections and returning to IDLE. Node 1 then notes that the transfer has been rejected, and returns to the IDLE state by resetting its VALID and 4 data lines to switch 10A to zeroes. Node 1 may then retry the transmission by reloading shift registers 54 from buffer 52 and starting the transmission over again from the very beginning (clock time −1). The retransmission can occur over the identical path as the previously rejected transmission, or if alternate paths through the network are implemented another path can be tried. If continuous REJECTs are encountered, such that a specified number of REJECTs occur for the same message, an error reporting mechanism may be invoked.

It is also possible for any switch 10 in a network path to REJECT a message. This can occur for either of two cases:

1) BUSY—If the output port to which the switch is commanded to connect is BUSY (i.e., it is being used by a previously established connection), the switch will signify this condition to the input port issuing the command by activating the REJECT line back to the previous network stage or to the transmitter (if the first stage of the network detects BUSY). For instance, in the example shown in FIG. 8, if 10A had received a command at clock time −2 to connect input port 4 to output port 2, that connection would have been active when input port 1 requested to be connected to output port 2 at clock time 1. In this case, output port 2 is BUSY at clock time 1 and switch 10A would activate the IN1-REJECT line to Node 1. As described above, the transmitter may retry any REJECTed message.

Likewise, the connection could be made successfully at switch 10A, yet output port 3 of switch 10F could be BUSY at clock time 3, causing switch 10F to issue the REJECT signal to switch 10A. This, in turn, causes switch 10A to return REJECT immediately to Node 1 after breaking its connections and returning to IDLE.

2) Simultaneous CONTENTION—Rather than input port 4 establishing a connection to output port 2 in switch 10A at clock time −2 as described above (in advance of the same command from input port 1 at clock time 1), it is possible for two or more input ports to try to connect to the same output port at approximately the same time. This is called CONTENTION for an available output port. For instance, suppose input ports 1 and 4 both sent simultaneous commands at clock time 1 requesting to be connected to output port 2. The present invention resolves this contention by first connecting both contending input ports 1 and 4 to output port 2. The net effect is to electrically connect the 2 input ports to output port 2, which will logically OR the signals coming from both sources. During clock time 2 the logical OR of the 2 input ports will NOT cause an error, because the values present on both input ports 1 and 4 are identical: the VALID lines for each are logical 1's and the data lines for each contain the DEAD FIELD (logical 0's). However, at clock time 3, the signals from each source could be different and an error could be caused if the 2 input ports both remained connected at clock time 3 and later. In other words, switch 10A has 1' cycle time (clock time 2) to correct the decision it made to connect two or more inputs to the same output. Switch 10A makes this correction during clock time 2 by detecting the fact that more than one input is connected to a given output. It then takes action by resetting all but one of the multiple connections, and does this before clock time 3 occurs. The decision of which connection(s) to reset and which one to keep is a decision based on priority. For the preferred embodiment, a simple priority scheme is used as follows: If input port 1 is contending it gets the connection, If input port 1 is not contending and input port 2 is, input port 2 gets the connection. If input ports 1 and 2 are not contending and input port 3 is, input port 3 gets the connection. Input port 4 gets the connection only if no other input port wants it. Applying the priority selection to our example, input port 1 gets to keep its connection to output port 2, while the connection of input port 4 to output port 2 is reset during clock time 2. This results in the REJECT signal being issued in the normal fashion from switch 10A to input port 4.

Thus, the purpose of the DEAD FIELD in the present invention is to allow one clock time per switch stage to resolve simultaneous contention. The secondary purposes of the DEAD FIELD are to cause a falling edge on the selection bit which was active during the previous clock time, and to compensate for timing skew which might be present across the 4 data lines carrying serial selection data to the cascaded switches. Both the rise and fall of data bits commanding the switches to make connections gives the unclocked switch two clock edges (rise and fall) on which it can trigger and make decisions. These are the only two decision making times available to the ALL-NODE switch.

Figure 9B:
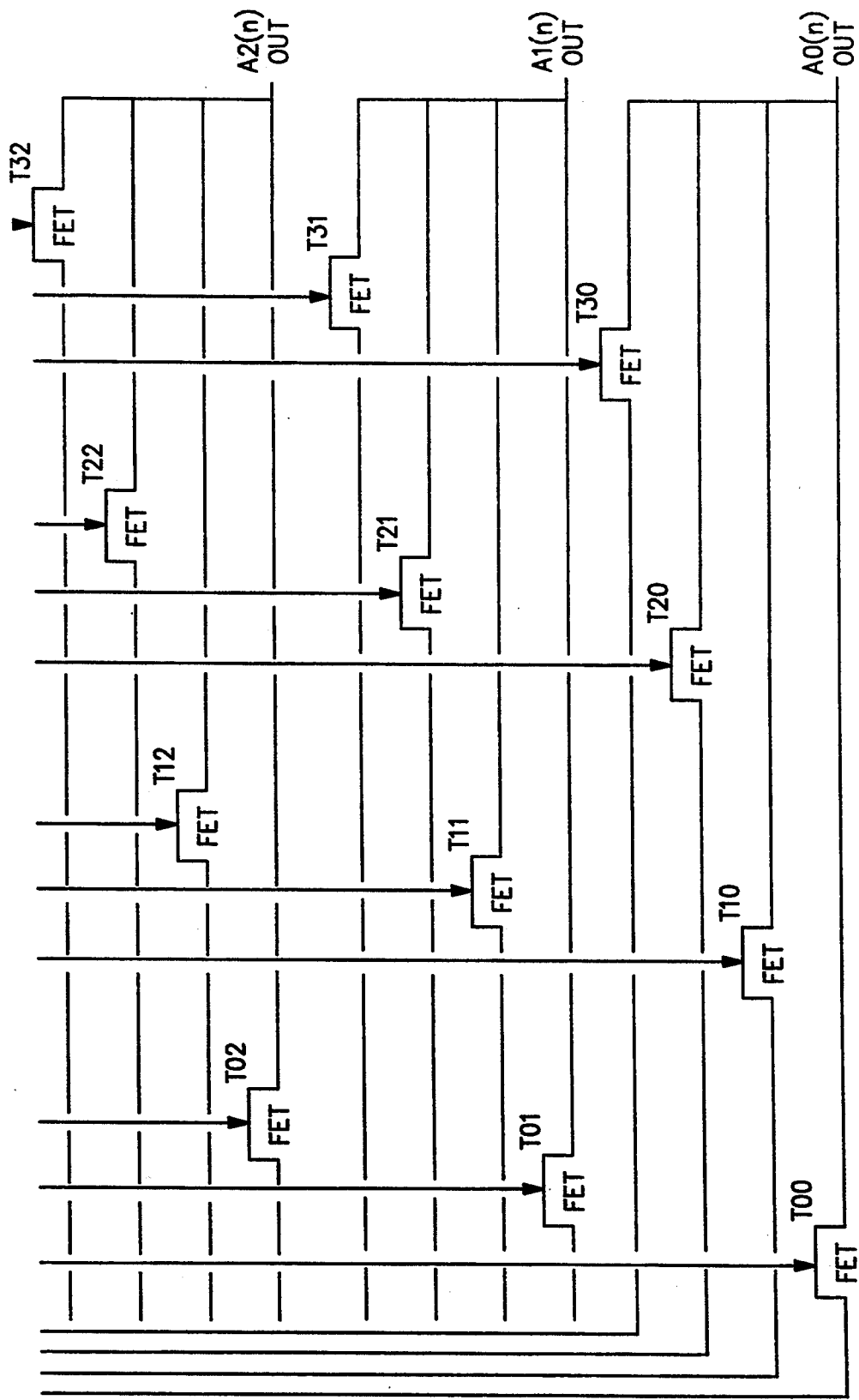
FIG. 9 illustrates the typical method of implementing the analog multiplexers used by the present invention to switch analog signals through the disclosed switching apparatus.

Referring to FIG. 9, more details are shown as to how the analog multiplexers 65A to 65D of FIG. 5A are implemented. For instance, analog multiplexer 65A is comprised of 4 Field Effect Transistors (FETs) labelled T00, T10, T20, and T30 which each receive one analog input line (A0(n) to A3(n)) from each of the 4 switching apparatus 10 input ports. Each FET circuit is activated by a FET switch gate drive circuit, which are labeled by channel, ie. FD0 for Channel 0, FD1 for Channel 1, etc. The FD0 to FD3 circuits receive their input control signals from multiplexers 50A to 50D, respectively—4 signals from each. The level shifted path select signals from FD0 to FD3 drive the gate of the appropriate FET switch such that the FET switches from the "Off" (high-impedance) state to the "On" (low-impedance) state. The "On" FET switch will pass the appropriate analog input signal A0(n) to A3(n) to the selected output channel. When the data transfer is complete, the FET switch gate drive is turned "Off", thereby causing the FET switch to return to the "Off" state. Consistent with the ANS architecture, each analog input A0(n) to A3(n) may be connected to any of the output channels in any combination. For clarity in reference, each FET switch is labeled "Txy", where "T" indicates an individual FET switch function(1), "x" indicates the input source channel associated with the FET switch, and "y" indicates the output sink channel associated with the FET switch. Note the structure of IO connections to the FET switches: each input channel is connected to four FET switches; each output channel consists of four parallel FET switches, each of which provide a potential signal path to the output channel from any one of the input channels. This structure is functionally the same as the configuration of muxes used in the ANS digital data path.

Figure 10A:
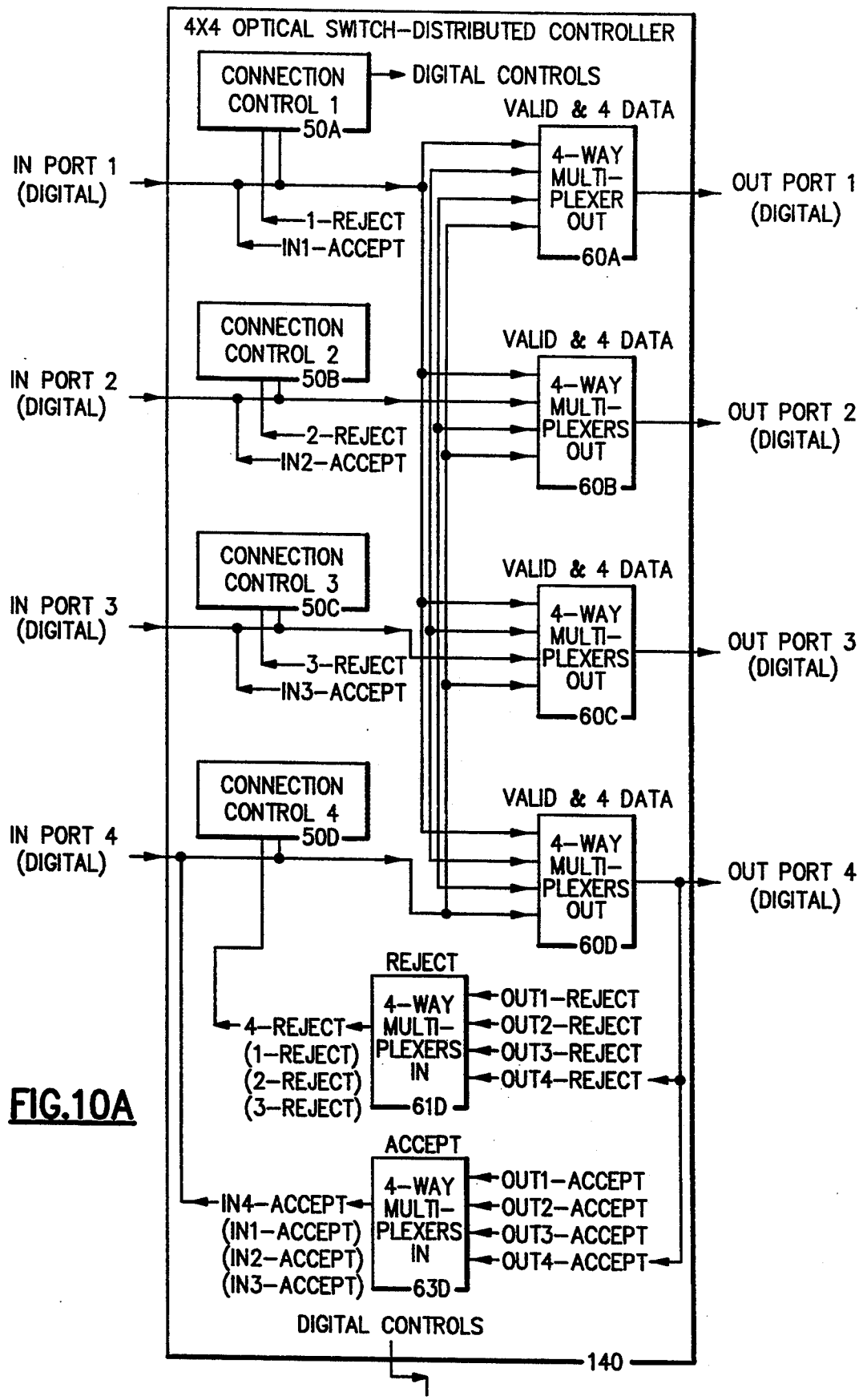
FIGS. 10A and 10B illustrate a typical method for using the parent embodiment of the invention switching apparatus for implementing a distributed controller function for high speed optical switches.
Figure 10B:
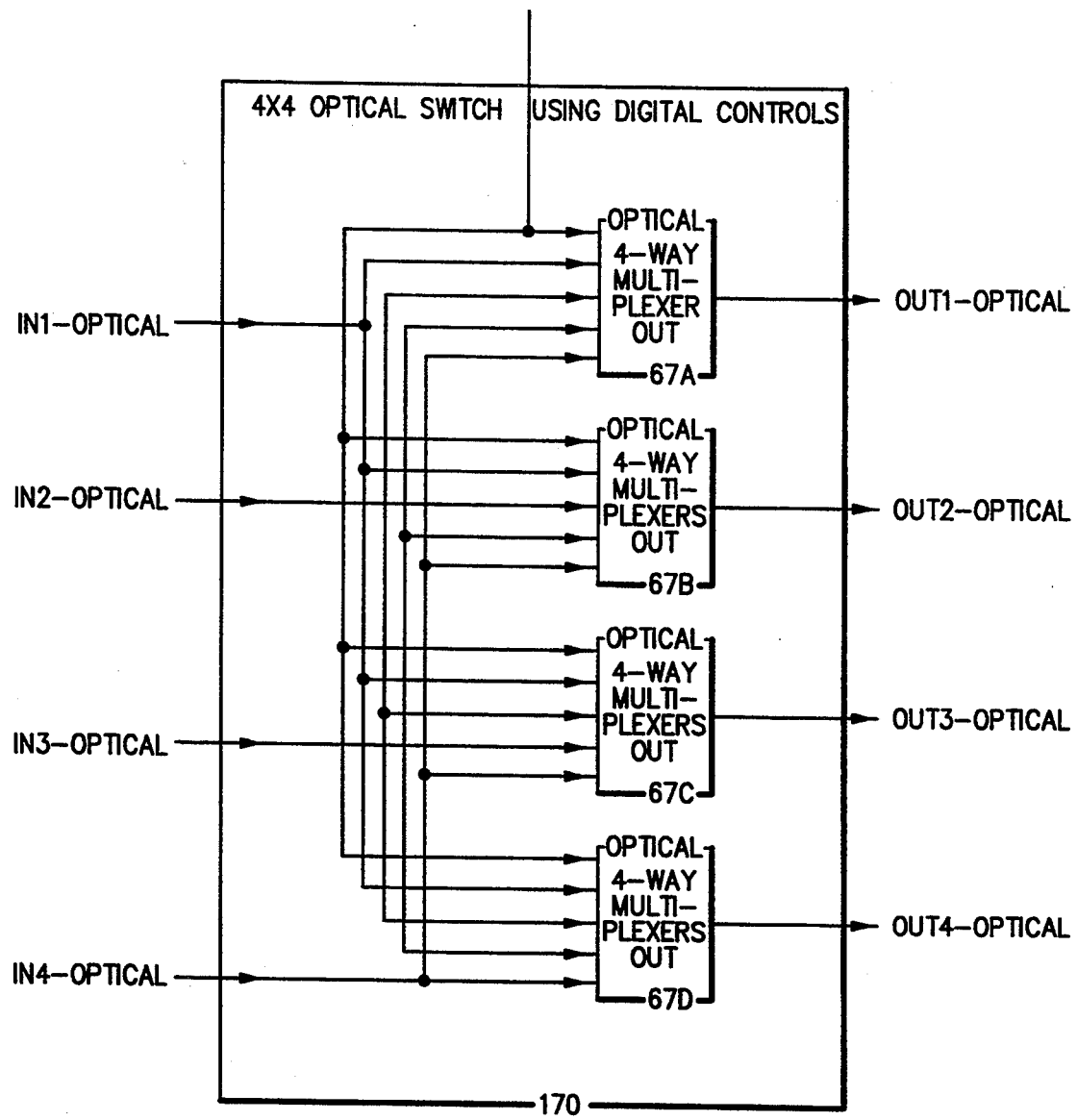

Referring to FIG. 10, an example is shown where a digital and a second non-digital transmission path do not have comparable technologies and cannot be combined in the design of a single chip. In this case, one chip 140 is required to perform the digital control function of setting up path connections, and a second chip 170 is required to implement the second transmission path—such as an optical path. Each control block 50A to 50D performs identically as described in regards to FIG. 5; however, digital control signals generated by blocks 50A to 50D are used as usual inside of chip 140 to select multiplexers 60A to 60D. In addition, these same digital control signal generated by blocks 50A to 50D are driven off chip 140 and input to chip 170, where they are used as digital select signals to control the optical multiplexers 67A to 67D on chip 170. The digital control signals are sent to optical multiplexers 67A to 67D, which establish the commanded optical interconnections, and permit optical signals to be switched from any of 4 input sources to any of 4 output sources. In this manner digital and optical signals can be transmitted at the same time or at different times; in either case, the transmission occurs over different digital or optical signal carrying interface lines. The optical transmission occurs over a single fiber or over Z multiple fibers between switch stages.

Clearly, the inventions which we have described by way of example and in illustration of our best mode of practicing the inventions in the various embodiments described provide a basis for much potential growth. Accordingly, it will be understood that those skilled in the art, both now and in the future, will envision further improvements even by way of invention, and these should be understood to be within the claimed scope which should be construed to protect and preserve the rights of the inventors.

What is claimed is:

1. A multi-media switching apparatus comprising:
    a plurality of input and output ports for transmitting digital and analog data;
    a digital connection control circuit for each input port;
    a digital multiplexer control circuit for each output port for connecting any digital inputs to said input ports to any of said output ports;
    an analog multiplexer control circuit for each output port for connecting any analog inputs to said input ports to any of said output ports;
    a multiplexer control circuit for each of said input ports for reporting a data rejection indication from any of said output ports to any of said input ports, and for reporting a positive feedback indication of receiving a successful data transmission from any of said output ports to any of said input ports.

2. The apparatus of claim 1 wherein the digital connection control circuits for each input port and the digital multiplexer control circuits for each output port operate asynchronously in relation to input signals received at each input port, need no clock input of any kind to perform its control functions of establishing digital and/or analog connections, and employ no buffering of data messages of any kind.

3. The apparatus of claim 1 wherein said apparatus can perform the multiple functions of transmitting any of two types of data commands or messages: digital data messages or digital control headers which are used to route analog signals via analog switches or analog multiplexers.

4. The apparatus of claim 3 wherein said input and output ports comprise a set of data lines having at least Z digital data lines, at least one analog data line, and three control lines: one signal, labelled VALID, for the purpose of enabling and terminating standard digital or analog transmissions; one signal, labelled REJECT, for signalling the rejection of digital or analog transmissions; and one signal, labelled ACCEPT, for signalling the acceptance of digital or analog transmissions.

5. The apparatus of claim 3 wherein said multi-media/switching apparatus is totally self-contained and makes all input to output port connection decisions, whether for digital or analog operations, based on path selection information received over said set of input port interface signals without requiring any other external interfaces or clock generation support.

6. The apparatus of claim 3 wherein said apparatus can support concurrently multiple commands to form digital or analog connections simultaneously within the same said apparatus.

7. The apparatus of claim 5 wherein said apparatus has expansion means for cascading together identical multi-media/switching apparatus devices by tying the output ports of said first multi-media/switching apparatus to the input ports of other said multi-media/switching apparatus devices.

8. The apparatus of claim 1 wherein there is absolutely no requirement of any kind for any type of synchronization amongst any of said input and output ports which interface to said switch apparatus.

9. The apparatus of claim 1 wherein said multi-media/switching apparatus is capable of operating in a mode free from logic race conditions or errors when several or all input and/or output ports are operated in synchronization with each other.

10. A distributed switching controller apparatus comprising:
    a plurality of input and output ports for transmitting analog and digital data;
    a digital connection control circuit for each input port;
    a digital multiplexer control circuit for each output port for connecting any digital inputs to said input ports to any of said output ports;
    a set of connection control signals for commanding optical switch connections and for connecting any optical inputs to said input ports to any of said output ports;
    a multiplexer control circuit for each of said input ports for reporting a data rejection indication from any of said output ports to any of said input ports, and for reporting a positive feedback indication of receiving a successful data transmission from any of said output ports to any of said input ports.

11. The apparatus of claim 10 further comprising digital connection control circuitry which operates asynchronously in relation to input signals received at each input port, needs no clock input of any kind to perform its control functions of establishing digital and/or optical connections, and employs no buffering of data messages of any kind.

12. The apparatus of claim 10 wherein said apparatus can perform the multiple functions of transmitting any of two types of data commands or messages: digital data messages or digital control headers which are used to route optical signals via optical switches or optical multiplexers.

13. The apparatus of claim 12 wherein said input and output ports comprise a set of interface signals having at least Z digital data lines, at least one optical data line, and three control lines: one signal, labelled VALID, for the purpose of enabling and terminating standard digital or optical transmissions; one signal, labelled REJECT, for signalling the rejection of digital or optical transmissions; and one signal, labelled ACCEPT, for signalling the acceptance of digital or optical transmissions.

14. The apparatus of claim 12 wherein said controller apparatus is totally self-contained and makes all input to output port connection decisions, whether for digital or optical operations, based on path selection information received over said set of input port interface signals without requiring any other external interfaces or clock generation support.

15. The apparatus of claim 12 wherein said apparatus can support concurrently multiple commands to form digital or optical connections simultaneously within the same said apparatus.

16. The apparatus of claim 14 wherein said apparatus has expansion means for cascading together identical multi-media/switching apparatus devices by tying the output ports of said first switching controller apparatus to the input ports of other said switching controller apparatus devices.

17. The apparatus of claim 10 wherein there is absolutely no requirement of any kind for any type of synchronization amongst any of said input and output ports which interface to said switch apparatus.

18. The apparatus of claim 10 wherein said switching controller apparatus is capable of operating in a mode free from logic race conditions or errors when several or all input and/or output ports are operated in synchronization with each other.

* * * * *